(12) United States Patent
Kleinwaechter

(10) Patent No.: US 8,156,685 B2
(45) Date of Patent: Apr. 17, 2012

(54) GREENHOUSE, GREENHOUSE COVERING, FILTER SYSTEM, LIGHTING SYSTEM, CONDUCTING SYSTEM, USE AND FEEDER APPARATUS

(75) Inventor: Juergen Kleinwaechter, Kandern (DE)

(73) Assignee: Sunvention International GmbH, Loerrach (DE)

( * ) Notice: Subject to any disclaimer, the term of this patent is extended or adjusted under 35 U.S.C. 154(b) by 75 days.

(21) Appl. No.: 12/224,276

(22) PCT Filed: Feb. 26, 2007

(86) PCT No.: PCT/DE2007/000352
§ 371 (c)(1),
(2), (4) Date: Oct. 6, 2008

(87) PCT Pub. No.: WO2007/095934
PCT Pub. Date: Aug. 30, 2007

(65) Prior Publication Data
US 2009/0158647 A1    Jun. 25, 2009

Related U.S. Application Data

(60) Provisional application No. 60/776,365, filed on Feb. 24, 2006.

(51) Int. Cl.
*A01G 9/14* (2006.01)
(52) U.S. Cl. ............................................................. 47/17

(58) Field of Classification Search ................... 47/17
See application file for complete search history.

(56) References Cited

U.S. PATENT DOCUMENTS

| | | | | |
|---|---|---|---|---|
| 4,198,953 A | * | 4/1980 | Power ........................... | 126/617 |
| 4,215,672 A | | 8/1980 | Chiapale et al. | |
| 4,529,269 A | | 7/1985 | Mutzhas | |
| 4,969,288 A | * | 11/1990 | Mori ................................. | 47/17 |
| 7,227,077 B2 | | 6/2007 | Kleinwächter | |

FOREIGN PATENT DOCUMENTS

| | | |
|---|---|---|
| DE | 38 28 575 | 3/1990 |
| EP | 0 077 496 | 4/1983 |
| EP | DE 32 23 445 | 12/1983 |
| EP | 0 927 729 | 7/1999 |
| EP | 1 090 955 | 4/2001 |
| EP | 1 686 140 | 8/2006 |
| EP | 1 808 067 | 7/2007 |
| JP | 07-031295 | 2/1995 |
| JP | 08-258228 | 10/1996 |
| WO | WO 00/20805 | 4/2000 |

OTHER PUBLICATIONS

International Search Report, Oct. 19, 2007.

\* cited by examiner

*Primary Examiner* — Frank T Palo
(74) *Attorney, Agent, or Firm* — Henry M. Feiereisen; Ursula B. Day

(57) ABSTRACT

The invention proposes numerous aspects for improving greenhouses which may lead to durable improvement of the worldwide climate system.

12 Claims, 6 Drawing Sheets

GREENHOUSE, GREENHOUSE COVERING, FILTER SYSTEM, LIGHTING SYSTEM, CONDUCTING SYSTEM, USE AND FEEDER APPARATUS

CROSS-REFRENCE TO TRELATED APPLICATIONS

This application is the National Stage of International Application No. PCT/DE2007/000352 filed on Feb. 26, 2007, which designated the United States and has been published as International Publication No. WO 2007/095934 and which claims the benefit of prior filed U.S. Provisional Patent Application No. 60/776,365 filed on Feb. 24, 2006.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to a greenhouse as well as to a covering, to a filter system, to a lighting system, to a conducting system, to the use of a material and to a feeder apparatus, each for a greenhouse.

Skilful utilization of the regenerative energies, plant growth also in arid regions of the world and lasting reduction of $CO_2$ emission increasingly are of lasting interest to mankind.

An advantageous greenhouse technology is known from DE 199 82 011.

It is the object of the invention to provide for an improved system.

SUMMARY OF THE INVENTION

According to a first aspect of the invention, this object is achieved by a transparent greenhouse covering comprising a fluoropolymer foil.

In order for a greenhouse to be of the most advantageous possible construction, it must have a transparent covering admitting as far as possible the passage of the entire solar spectrum.

The inventor found out that fluoropolymer foils are particularly suited therefor since, according to test results, they admit passage of up to 97% of the entire luminous flux.

The low optical index of refraction n of about 1.3 is of particular benefit, since it leads to slight partial reflections on the front and the back side of the foils. As a result, the major part of the light is admitted through, even in case of oblique light incidence on the covering.

The very high transmission in the UVA range is of particular benefit. It is not only advantageous for plants but also contributes to a long life of the foils since the high energy UV light does not destroy the foils when it is transmitted but only when it is absorbed. The quite long fluoropolymer chains remain stable even when subjected to UV radiation.

Moreover, a fluoropolymer foil is chemically inert to a large extent and has no softeners. As a result of the low surface energies, the surfaces are moreover capable of cleaning themselves from dirt particles to a large extent. These dirt particles only find little adherence on the surface. Moreover, fluoropolymer foils are very stable mechanically, possibly occurring cracks will in particular not propagate in the foil. As a result of the advantageous mechanical properties of fluoropolymer foils, coverings having quite large a surface as they are used when the greenhouse beams are spaced a great distance apart can also be implemented with a small foil thickness. The inventor proposes a foil thickness ranging between 100 μm and 200 μm.

Beneath a fluoropolymer foil used as a greenhouse covering, the entire terrestrial sunlight spectrum is almost completely preserved and can be used on purpose. It is then in particular possible to supply the sunlight spectrum as useful energy for different applications by using coupled filter systems and/or by selectively separating discrete spectral ranges.

The document DE 199 82 011 illustrates by way of example the separation of spectral ranges of light. Therein, Fresnel lenses forming linear or point images of the sun are tracked on one or two axes. These lenses only concentrate direct sunlight upon a receiver. This receiver is provided with photovoltaic, thermal or photochemical equipment. Diffuse daylight, by contrast, passes through the Fresnel optics, thus serving for the plants to grow.

According to a second aspect of the invention, the object is achieved by a filter system for filtering incident light in a greenhouse with a fluid filter, said filter system comprising a light gathering optics lying in the course of the light upstream of the fluid filter.

Greenhouses with fluid filters are known. In a greenhouse archetype in Israel a covering for a greenhouse has been constructed, which is double-walled over its entire surface. Water as the filter fluid was filled into this large surface double-walled covering. Water is highly transparent to the incident visible solar spectrum and strongly absorbs light from 1.1 μm wavelength, combined with traces of salts, metals or other suited additives which are complementary to the absorption spectrum of chlorophyll.

Large surface double coverings through which a fluid flows are however quite prone to failure such as leakage. Moreover, they are expensive and heavy. The second aspect of the invention as presented concentrates a fluid filter with a light gathering optics. If a light gathering optics is disposed in the light path upstream of the fluid filter, the fluid filter can be configured to have small spatial dimensions and still have the desired filtering effect. This makes the filter system much more compact and cheaper.

It is proposed that the filter fluid is carried in an absorber, in particular in tubes, cylinders or balls. These are inherently tight and also very cheap. Moreover, only little amounts of filter fluid are needed.

The filter system preferably comprises a highly concentrating converging lens. The efficiency of converting radiation into heat increases with light concentration.

It is preferred to provide means for displacing the fluid filter with respect to the light-gathering optics in particular for reversibly displacing an absorber with respect to a focal point or a focal line.

If a light-gathering optics is provided, this optics, for example the lenses of the light-gathering optics, can be optionally pivoted for passage of the entire spectrum or of a part of the entire spectrum, which may be chosen, to be admitted to the plants. As an alternative or in addition thereto, it is possible to move the absorber out of the focal plane of the light-gathering optics in order to achieve the same effect. In the morning or in the evening for example, or in winter, when the sunlight is not so strong, higher radiation energy can be admitted to the plants.

As a result, it is possible, via a closed control circuit between the optics and the plants, to adjust the light conditions as a function of the variable need of the plant, in particular depending on its state of growth, the season and other bioparameters.

This variability allows for controlling the system consisting of optics and plants with regard to the main effect one wants to achieve, for example "more biomass, less technical energy" or vice versa.

In a concrete implementation, transparent tubes, balls, cylinders or similar absorber containers for containing the filter fluid can be disposed in the focal lines or focal points. These containers are preferably adapted to the respective shape of the focus.

A medium flows through them, which admits passage of the PAR range therethrough. The PAR range is about 10% of the overall radiation. The rest must be absorbed and converted into heat. As a result, about 90% of the radiation is converted into useful heat whilst about 10% of the radiation directly serves for the plants to grow.

Preferably, the filter fluid admits passage of at least 50%, preferably of at least 80%, of the PAR range of light, but absorbs an excess above the PAR spectrum of at least 50%, preferably of at least 80%.

As a result, the plants are offered the best light for photosynthesis on the one side. On the other side, excess heat is evacuated. This heat can be stored and supplied to the plants as thermal heat in a cold night for example. Plants need as far as possible constant temperatures for their growth, preferably about 20° C.

According to a third aspect of the invention, the object is achieved by a filter system for filtering incident light for a greenhouse, said filter system comprising a spectral range reflector and a secondary reflector, said spectral range reflector being devised such that it filters and reflects a range of the PAR spectrum to the secondary reflector, residual light being admitted through the spectral range reflector to a plant area and filtered and reflected light being directed from the secondary reflector to the plant area.

With such a two-stage optical system, it is possible to reflect a range of the incident light. The light which is admitted through reaches the plant area. The light which is reflected by the filter, meaning by the spectral range reflector, has a longer path to travel. Through the longer path, it is possible to process this range of the spectrum on purpose. Only after it has been processed will this range of the PAR spectrum be directed to the plant area.

Such a double optics is of particular use if the spectral range reflector reflects at least part of the spectrum ranging between about 500 nm and about 580 nm, preferably at least between 520 nm and 560 nm.

The inventor found out that the green light contributes only to a negligible extent to the photosynthesis although quite the major part of the energy is incident in this range of the PAR spectrum. Green light is to be found in the range between about 500 nm and about 580 nm, more specifically between about 520 nm and 560 nm.

Therefore, plant growth can be considerably encouraged if one achieves to selectively couple the green range out and to then process it further.

The spectral range filter is preferably transparent to light up to about 500 nm. The inventor found out that light in this range is very useful to plant growth. The same applies for light from about 580 nm.

Preferably, the filter system is devised to subject the filtered and reflected light to phase-shifting.

If a phase-shifting process is provided, it is possible to displace the filtered and reflected light into the range of the PAR spectrum that is most useful to plant growth. It is particularly proposed that the filtered and reflected light be converted into red-yellow light in the phase-shifting process, typically a fluorescence process. This red-yellow light is preferably also supplied to the plant area after phase-shifting.

Phase-shifting preferably achieves light of more than 600 nm, more specifically of more than 680 nm.

The filter system is particularly suited if the incident light passes through a light-gathering optics and if the spectral range reflector is disposed at an incline with respect to an optical axis of the light-gathering optics, in particular at an angle ranging from about 40° to about 50°.

With such a constellation, it is possible to direct the light filtered and reflected by the spectral range reflector out of the remaining optical path by simply inclining the spectral range reflector so that in particular the secondary reflector can be disposed outside of the remaining optical path. This not only increases the freedom in arranging the discrete elements in the greenhouse but also keeps clear, as far as practicable, the main optical path for the light energy to be utilized to the greatest possible extent.

The spectral range reflector can in particular be arranged between the light-gathering optics and its focus. This leads to a triple optics consisting of light-gathering optics, spectral range reflector and secondary reflector, the focal point of the light-gathering optics only lying in the light path beyond the spectral range reflector so that an absorber can be arranged there, for example, as described herein above, in the form of a fluid filter in a tube, a cylinder or a ball.

The spectral range reflector preferably comprises a secondary focus for the filtered and reflected light. On such a configuration of the spectral range reflector, the filtered and reflected light can be processed further with an array of a quite compact construction. On its side illuminated by the spectral range reflector, the secondary reflector preferably comprises a red and/or a yellow coating, in particular a coating with a fluorescent dye.

A filter system is in particular envisaged, in which there is at first provided, beneath a light-gathering optics, a filter serving as the spectral range reflector, being transparent up to 500 nm, reflecting between 500 nm and 580 nm and being again transparent above 580 nm. It can be mounted upstream of the focal plane of the light-gathering optics, inclined at an angle with respect to the optical axis for its secondary focus of green light to form outside of the primary bundle of rays whilst the residual light passes through the filter and is incident on an absorber tube with filter liquid. In tests made by the inventor it has been found out that a dichroic filter inclined at an angle of 45° is very appropriate.

In the range of the secondary focus for the green light, there can for example be disposed a horizontally suspended plate the underside of which is now illuminated in green, said plate being for example coated with the fluorescent dye TeS flame red. As a result the plate converts the green light into the desired red-yellow light. This red-yellow light is then sent to the plant area as a Lambert radiation in an improved way.

In the filtered and reflected light, there is preferably disposed a converter, in particular a solar cell.

It may for example be envisaged to dispose underneath the plate which serves as a secondary reflector a solar cell particularly efficient for green light or another appropriate converter for green light so that additional electric current can be generated or other desired effects can be achieved such as photochemical reactions.

With the arrangement described, it is possible to selectively filter out the spectral range which is virtually inefficient for photosynthesis without affecting the other spectral ranges in such a manner that the plant is supplied with more preferred light than this is possible under normal conditions. This considerably increases the plant productivity.

Conventionally, it is known to incorporate fluorescent pigments into a transparent greenhouse covering. A test in Israel yielded an increase of about 20% in the productivity of tomatoes. However, it suffers from the trade-off that the spectral ranges suited for the plant are also weakened. Moreover, quite a lot of expensive fluorescent dye is needed for processing the covering. Additionally, when the fluorescent dyes lose efficiency due to ageing, the entire covering of the greenhouse must be exchanged, which is very expensive. With the previously described system, by contrast, it is possible to only have to coat a small area of the red-yellow emitter when the desired effects decrease with ageing.

According to a fourth aspect of the invention, the object is achieved by a lighting system for a greenhouse with a light storing fluid.

It is known to incorporate suspended phosphorescent particles into suited liquids, to let sunlight excite them in transparent sun collectors and to bring the light stored in the liquid either directly into dark rooms or into liquid tanks from which it is directed at need to rooms for lighting them.

It is also known to illuminate greenhouses at night with electric current since tests showed that a plant grows more efficiently if it also receives light at night in certain periods.

The use of a light storing fluid for a lighting system of a greenhouse is not known. Light storing fluids store the energy transmitted by light only in spectral ranges that are of no interest to plant growth. The inventor however found out that even storage of the light which is of no help to plant growth can be used sensibly.

It is proposed that the light storing fluid is phosphorescent. Phosphorescent particles are widely known. Tests made by the inventor have shown that phosphorescent particles are particularly suited, combined with silicone oils and/or fluorinated liquids, since they allow achieving a half-life of the luminosity of more than 20 hours in parts. Although they shine in the green spectral range of light, they can be utilized successfully for plant growth.

Preferably, there is provided a storage tank for the light storing fluid. The light storing fluid can be taken therefrom at need, in particular during the night.

It is proposed that a light emitter be provided in a plant room for emitting the light storing fluid into the plant room. With such a light emitter, the stored light can be delivered to the plants on purpose.

Preferably, a red-yellow light converter is associated with the light emitter, said light converter generating from the green light emitted by the light storing fluid red-yellow light which it emits to the plants.

It has already been explained that particularly efficient light storing fluids radiate in the green spectral range of light. If however a red-yellow light converter is provided, the green light can be converted into such a light, which considerably contributes to plant growth. The red-yellow light converter can stay permanently in the plant room. As an alternative it may also be envisaged to only arrange it between the plants while they are fed with the shining storing fluid.

The light emitter preferably comprises vertical double plates. Double plates can be built at low cost and can be fed with the light storing fluid on their inner side. Moreover, double plates can be disposed between plant rows so as to save space.

The following system may in particular be envisaged: there is provided a light filter that is configured to be a dichroic filter for example and that focuses blue light with a wavelength of less than 500 nm onto a transparent tube. As described herein above, this can preferably occur via an inclined spectral range reflector which filters and reflects blue light with wavelengths of less then 500 nm to this tube and that bundles it preferably toward said tube. In the transparent tube, phosphorescent particles are disposed in a suited carrier liquid, said phosphorescent particles being excited by the blue light to shine green. The liquid with the green shining phosphorescent particles is pumped into a fluid tank.

At night, this liquid is pumped from the storing stank into double plates that are placed in the plant room, between the rows of plants. On the right and on the left of these double plates through which the liquid can flow there are placed thin plates which are coated with fluorescent dyes that convert the green light into red-yellow light which they send to the surrounding plants.

Direct storage of daylight in the form of liquid light as it has been described herein above is absolutely novel and much more economical than the conventional illumination of greenhouses with electrical light.

According to a fifth aspect of the invention, the object is achieved by a conducting system for conducting incident light for a greenhouse, a light-gathering optics being at first disposed in the light path, then a stray optics and finally a prism.

Prisms as such are known. A glass prism is an optical system, which, when light rays of white sunlight are introduced therein parallely, decomposes this sunlight into a rainbow spectrum. The present inventive idea substantially provides for widening this known principle by first concentrating the light before it enters the prism and to parallelize it then. This makes it possible to bundle the energy of sunlight and to provide a prism for decomposing the concentrated light with limited means in terms of space, which as a result thereof are also low cost. As a result, one obtains concentrated light which is divided in the spectral components. This light can then be selectively tapped and further processed.

The light-gathering optics is preferably part of a greenhouse covering.

It is proposed that the stray optics be disposed in the light path, shortly before a focus of the light-gathering optics. The light-gathering optics bundles incident sunlight toward its focus. Shortly before and shortly behind the focus, the beam path of the light only has a small width so that a stray optics can be provided that is quite small and corresponds to this width. If the stray optics is located before the focus, space can be saved. It is understood that it is also possible to dispose the stray optics beyond the focus.

It is preferred that the stray optics parallelizes the light ideally, with parallelization being still sufficient if the beam path differs by 10° maximum or by 30° maximum.

The following system in particular may be envisaged:

A lens forming a point image in the greenhouse covering concentrates incident daylight by means of the optics described toward a glass prism that decomposes the highly concentrated light into strips of the rainbow spectrum in which the colored light is also highly concentrated. To decompose light, prisms need parallel light on their input side. Since the concentrator lens of the light-gathering optics delivers a converging bundle of rays, this bundle must be parallelized in the region shortly before or shortly behind the focus. This preferably occurs with a double concave lens the negative focal length corresponding of the positive focal length of the primary light-gathering optics.

The concentrated rainbow light can then be utilized for various purposes. For example, the red and the blue light, two ranges of the PAR spectrum, can be readily directed onto the plants, while the green light strikes a concentrator solar cell. It can also be converted into red-yellow light for best illuminating the plants for example. This has already been described herein above.

Since usually the intensities in the concentrated bundles of colored rays are too high for the plants, there can be provided at first in the beam path a liquid filter for generating additional heat.

For particularly efficient conversion of light into electricity, corresponding semiconductors can be placed into the respective colour strips the effective spacing of which corresponds to the colour of the respective light.

For illuminating with white mixed light, conventional solar cells have vertically built up layers for the discrete spectral ranges. Using the technique proposed therein, the different semiconductor layers for the discrete spectral ranges can be arranged side-by-side, in particular in one plane. This not only prevents light from getting lost in the conventionally superimposed layers but also leads to a lower cost construction.

The proposed light conducting system makes it possible to decompose the light into spectral ranges of highly concentrated colors by simply using and sensibly combining known optical systems, namely a primary concentrator optics such as a Fresnel lens, a double concave lens for parallelization and a prism. Optical coatings or similar costly systems are not needed.

According to a sixth aspect of the invention, the object is achieved by the use of fluoropolymer as a material for a converging lens, in particular for a Fresnel lens, for a foil to be hung beneath a light-gathering optics of a greenhouse, for a heat exchanger and/or for a transparent heat insulation.

Herein above the advantages obtained in using fluoropolymers as the material have already been mentioned, with reference to the greenhouse covering. These advantages are in particular a very high transparency in the UVA range which is important to greenhouses, high mechanical and thermal stability, chemical inertia and self-cleaning as a result of low surface adherence.

Such properties are of paramount importance for a Fresnel lens or generally for a light-gathering optics. Presently, converging lenses are made almost exclusively from PMMA. According to tests made by the inventor, light-gathering optics, concretely converging lenses, can also be made from a fluoropolymer foil. As compared to PMMA lenses, they are much more stable over a longer period of time. Moreover, diffuse UVA light can penetrate directly to the plants, which is of paramount importance for the taste of fruit and vegetable, for the colour and for natural disinfection. Direct UV light can be bundled, coupled via selective filters, and either additionally emitted into the plant room or be utilized for special purposes such as disinfection of drinking water, special photochemical reactions or the like.

The same advantages are achieved by hanging a foil beneath the lenses, as it is known for example in the cushion-shaped modules for a greenhouse covering according to DE 199 82 011. The material is also perfect for use for a heat exchanger as it will be described herein after.

Moreover, in greenhouses, transparent heat insulations are often disposed beneath the converging lenses on the foil suspended underneath. A transparent heat insulation provides for a more constant climate in the greenhouse, with concurrent UVA transmission. Also, such a transparent heat insulation can be utilized on the vent stack. This vent stack will be explained later within the frame of this patent application.

A greenhouse with a covering made from a fluoropolymer foil has outstanding properties with regard to plant growth, natural disinfection and has a long life. If the fluoropolymer foil is not only used for the outer covering but also for component parts inside the greenhouse, technical synergetic effects can be achieved. Also, this material can be purchased at lower cost and less storage space must be provided for spare foils or spare materials.

According to a seventh aspect of the invention, the object is achieved by a greenhouse with an updraft chimney.

A solar updraft chimney can periodically or continuously ensure air circulation in the greenhouse without extra energy supply. Conventional greenhouses by contrast open ventilation flaps in the greenhouse and additionally use fans.

Except for the air outlet cross section and for the air intake cross section, the greenhouse can be kept hermetically closed. These well defined inlet and outlet ports, meaning the air intake cross section and the air outlet cross section, can remain durably open over periods or constantly; they should then be protected against animals with a close-mesh screen such as a fly screen. It is known that the white fruit fly for example is capable of destroying a large percentage of the tomato crop.

Conventional greenhouses are very expensive to close with screens because they have large mobile ventilation flaps of difficult access and if they are closed with screens, closure is not always operationally safe.

Preferably, an underground channel system for air intake is provided. In such a system, the air can be pre-cooled in summer and pre-heated in winter.

It is proposed to provide for humidifying the intake air. This can for example occur in an underground channel if it is provided. Preferably, water haze is sprayed into the air drawn. The evaporated water can effect adiabatic cooling of the greenhouse.

Preferably, a water-air heat exchanger is provided in the top or in the bottom part of the updraft chimney.

On conventional greenhouses, water utilized for adiabatic cooling gets lost. This is one of the major logistical and economical problems of greenhouses in hot regions of the earth. This problem can be avoided using a water-air heat exchanger, in particular using a countercurrent heat exchanger. The heat exchanger should be the link between the air inside the greenhouse and the air column rising under the heat of the sun in the updraft chimney. The rising air column generates an underpressure that draws the humid air inside the greenhouse through the air channels of the countercurrent heat exchanger.

When the water-air heat exchanger comprises water recirculating means, the water can be prevented from leaving the greenhouse through the updraft chimney, at least to a large extent. In a particularly simple implementation, the heat exchanger can be disposed inclined at an angle with respect to the horizontal, while in countercurrent channels water circulates the temperature of which is lower than the temperature of the humid air. As a result, the water contained in the air is condensed out and can be recovered at the lower end of the countercurrent heat exchanger.

During this process, thermal energy is automatically drawn from the air into the water and can thus be utilized for other purposes. The countercurrent heat exchanger described thus constitutes a combined water heat recuperator.

In principle, adiabatic cooling of the greenhouse can also be achieved by evaporating salt water or industrial water. In this case, the countercurrent heat exchanger additionally performs the function of recovering fresh water.

The dynamically driving part of the above system is the hot air column rising in the chimney. In order to optimize this effect, it is proposed that the updraft chimney is darkened, in particular in parts, and is preferably covered with a heat insulation. A bright or mirror-like implementation effects low heat emission.

It is proposed to provide for a regulating system for the air mass flow in an intake channel of the greenhouse. In this way, the hot air column in the updraft chimney can permanently upkeep its upward draft without any disturbances.

The updraft chimney performs the functions described without fossil or electrical auxiliary energy and is of particular benefit when used in combination with the water-heat recuperator.

Two different methods are particularly advantageous for cooling the water in the countercurrent heat exchanger:

On the one side, it can be envisaged to protect a portion of the surface about the greenhouse against sunlight during the day by means of foldable mirror lamellae (or of a rollable mirror foil or similar). This prevents the underlying ground or sand from heating up through radiation.

By night, the reflector is displaced for the heat of the ground to radiate into the cold sky. According to tests run by the inventor, this mainly functions in arid and semiarid regions in which the sky is clear at night. On a prototype, the inventor could find radiation power of up to about 100 W/m$^2$.

An underground register of water carrying tubes can thus ensure that the temperature in the countercurrent heat exchanger drops below dew point as desired.

Alternatively, it can be envisaged that a water tube register is introduced into the ground up to a certain depth where the water is cooled to the required temperature.

According to the present appraisal of the inventor, the first alternative proposed is however to be preferred since in the night sufficient cool temperatures can be accounted for.

According to an eighth aspect of the invention, the object is solved by a greenhouse in which there are provided heat evacuation means for evacuating heat from photovoltaic cells into a geothermal heating system and/or into a fluid storage heating system.

The principle of coupling a greenhouse with geothermic power is known. Instead of geothermic power, a large well heat-insulated water tank can be used, what is referred to as a hot lake being best used in which the surface turned toward the sun additionally actively recovers sun heat.

The aspect of the invention which is proposed here relies on the observation that the exhaust heat from the greenhouse (meaning in particular the cooling water of the photovoltaic cells) needs a heat sink, meaning a water tank or a cooler ground layer, which it however thermally charges as a result thereof, thus actively contributing to heating the heat tank.

According to a ninth aspect of the invention, the object is achieved by a feeder apparatus for introducing carbon dioxide into a greenhouse, means for recovering carbon dioxide from calcium carbonate being provided.

Carbon dioxide is also supplied to conventional greenhouses in order to increase plant growth. The carbon dioxide is in parts taken from gas bottles and in parts from power plant or engine exhausts from where it is conducted into the greenhouses.

This method however is very complex and expensive. The inventor recognized that by contrast calcium carbonate can be provided and stored more readily and that calcium carbonate is willing in releasing its carbon dioxide. This carbon dioxide can be used to encourage plant growth.

Preferably, the means for recovering carbon dioxide comprise a focusing optics for burning the calcium carbonate. Burning the calcium carbonate is part of what is termed the lime cycle. The calcium carbonate can for example be conveyed on a conveying belt into the focal point of a concave mirror. Here, the solar energy can be concentrated onto a cavity receiver on a vibrating bed and, if the design is appropriate and solar radiation sufficient, the calcium carbonate is heated to such a temperature for the lime to burn. Quicklime (CaO) is thus obtained, under release of carbon dioxide.

The carbon dioxide released during burning is blown into the greenhouse where it encourages increased plant growth.

Preferably, there is provided a circuit transport for conveying quicklime to the outside air for removing therefrom free carbon dioxide. When the quicklime is exposed to free atmosphere, the amount of carbon dioxide contained in the atmosphere is reduced.

Moreover, quicklime again converts into calcium carbonate so that the carbon cycle can be resumed.

It is also considered to provide a circuit transport that supplies burnt lime to quenching and then to the outside air where free carbon dioxide is removed. If the burnt lime is quenched with water, calcium hydrogen carbonate forms in a strongly exothermic reaction. The quenched lime then again absorbs atmospheric carbon dioxide, thus becoming calcium carbonate again so that the cycle can be resumed.

When lime is being quenched, one preferably supplies excess heat from a thermodynamical machine. The heat generated anyway during quenching can thus serve to operate a machine, for example with an external heat exchanger or for loading a heat store.

With the method proposed, carbon dioxide is drawn from the atmosphere via the lime cycle by means of solar energy and is incorporated into biomass. Additionally, useful process heat is generated.

According to a ninth aspect of the invention, the object is achieved by the use of constituent parts of plants that have grown in a greenhouse as an additional charge in component parts.

Plants are in particular thought of which are grown by drawing carbon dioxide from the atmosphere.

If, as described herein above for example, free carbon dioxide is drawn from the atmosphere and is incorporated into biomass, the duration of carbon dioxide fixation depends on how the biomass is used. If the biomass is consumed, if vegetables or fruit are for example eaten, the carbon dioxide is completely returned to the atmosphere through human or animal digestion. Accordingly, the entire process is neutral with respect to carbon dioxide.

However, it is advantageous if the biomass is at least in parts durably capable of binding carbon dioxide. This is possible by using the biomass on purpose. Thus, suited plant materials, mostly plant fibers, can be incorporated into long-life building materials or structure materials. Plant fiber reinforced clay bricks or plant fiber reinforced material for lightweight construction for cars, aircrafts and so on can be more specifically envisaged.

The greenhouse effect can thus be durably reduced. Presently, there is a public discussion of storing carbon dioxide from power plants or from traffic in underground caverns or in the sea. The aspect of the invention that has been presented here constitutes an active method of drawing the carbon dioxide from the atmosphere and of utilizing it sensibly, with operation additionally only relying on solar energy so that there are no emissions.

The invention as presented generally contributes to substantial effects for decelerating or preventing the worldwide beginning climate change.

BRIEF DESCRIPTION OF THE DRAWING

The invention will be described in closer detail herein after with respect to the drawing. In said drawing.

DETAILED DESCRIPTION OF PREFRRED EMBODIMENTS

Figure 1:
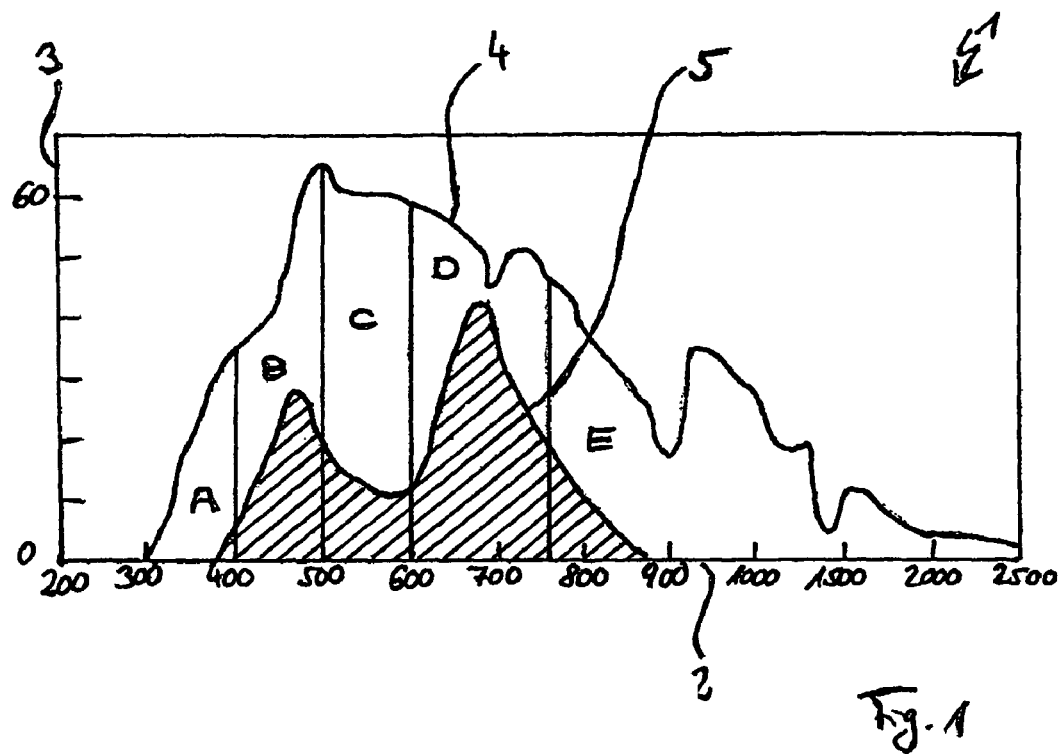
FIG. 1 concurrently shows the terrestrial solar spectrum and the photosynthetically active radiation (PAR),
FIG. 2 schematically shows a green light filter.

The diagram 1 in FIG. 1 shows on its abscissa 2 the wavelength of the light in nm. On the ordinate 3, there is plotted the intensity of the respective wavelength.

Using measured data, a first curve 4 describes the terrestrial solar spectrum. A second curve 5 shows the photosynthetically active PAR radiation.

Concurrently, the solar spectrum is divided into portions A, B, C, D and E. In the range A, the prevailing radiation is UV-A. This radiation has no effect on plant growth but is responsible for more intensive colours, stronger flavour and natural disinfection.

The spectral ranges B and D are the most effective portions of the spectrum for photosynthesis of the plants.

The radiation in the ranges C and E only contributes to a small extent to photosynthesis.

Figure 2:
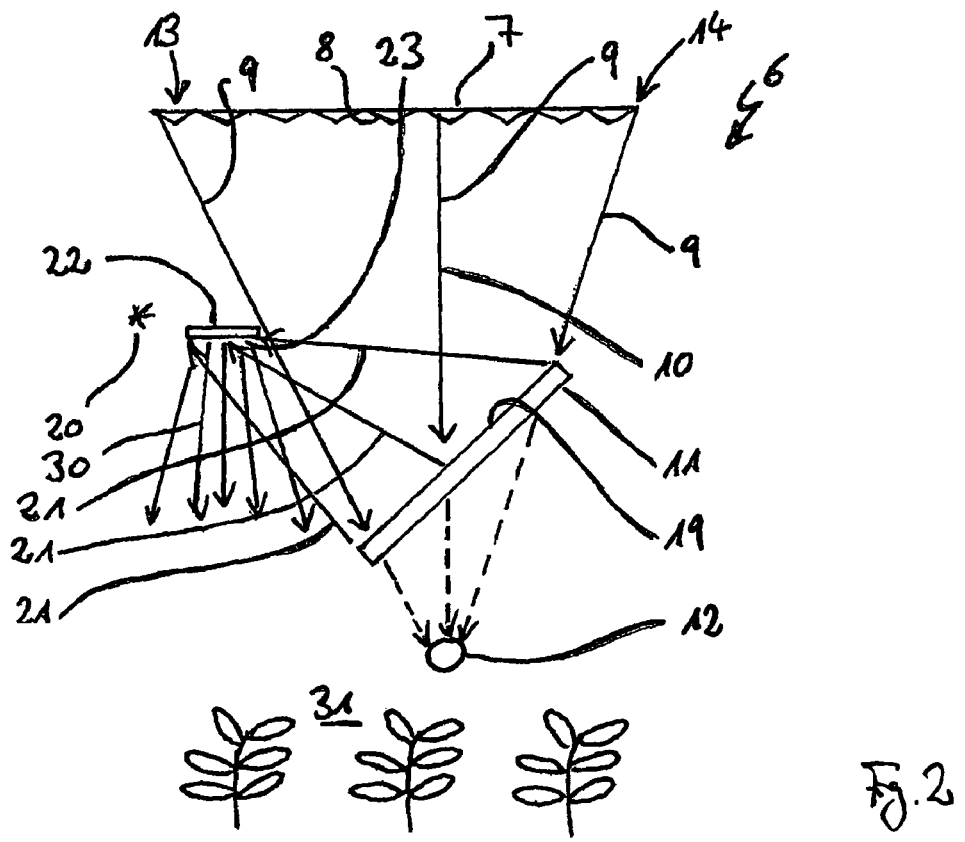

The plant 6 in a greenhouse (which is not shown as a whole) in FIG. 2 takes advantage of the fact that sunlight can only be utilized sensibly in parts for plant growth.

A housing covering 7 consists of modular adjacent light-gathering optics 8 (labelled by way of example) so that direct solar radiation is introduced in a bundle into the greenhouse. In the beam path of a convergent bundle of rays 9 (labelled by way of example), a liquid filter 11 is disposed at an angle of about 45° with respect to an optical axis 10 of the housing covering 7 serving as the light-gathering optics. The light rays of the bundle of rays 9 pass through this liquid filter before they reach their focal point 12. The size of the fluid filter 11 is accurately adapted for the rays from the border regions 13, 14 to also strike the fluid filter 11.

Figure 3:
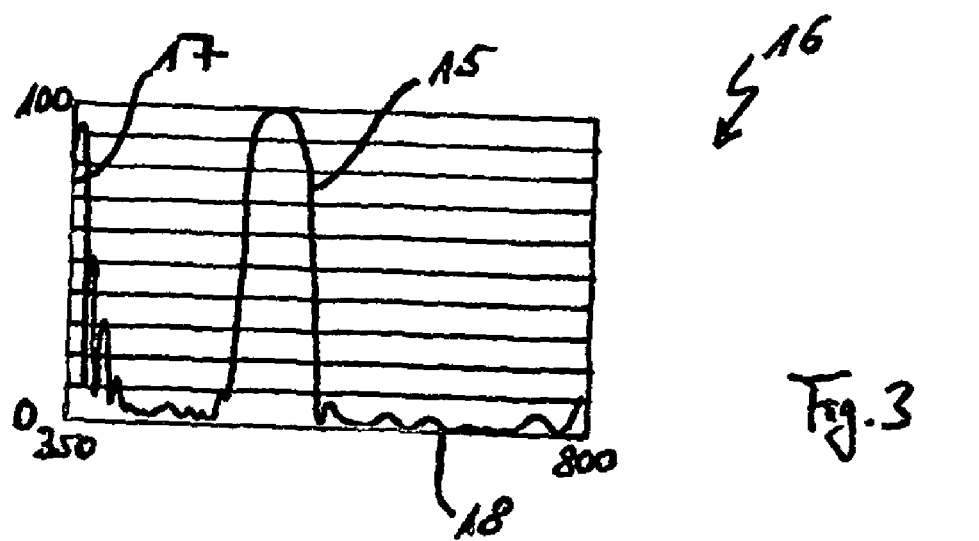
FIG. 3 shows a diagram of the reflection characteristic curve of the green light filter of FIG. 2.

In the range between about 400 nm and about 500 nm, the fluid filter 11 is almost transparent, which it also is in the range above about 570 nm. Only the spectral range between about 500 nm and about 570 nm reflects the liquid filter 11 almost completely. This is obvious from the measured curve 15 in FIG. 3. The diagram 16 in FIG. 3 shows the reflection of the light in percentage points on the ordinate 17 above the wavelength of the light on the abscissa 18.

Accordingly, the fluid filter 11 serves as the green light reflector.

The reflected green light is reflected from the fluid filter 11 by virtue of the bundle of rays 9 converging into a secondary focal point 20 before the fluid filter 11 and its planar surface 19. As a result, a green light bundle 21 (labelled by way of example) is generated.

The green light bundle 21 has its secondary focal point 20 outside of the bundle of rays 9 of the incident sunlight. As a result, it is possible to dispose a secondary reflector 22 before reaching the secondary focal point 20 but outside of the bundle of rays 9. The secondary reflector 22 is a plate, which is suspended approximately parallel to the greenhouse covering 7 the dimension of which is in turn adapted to the width of the green light bundle 21 there. It has one underside 23 coated with flame red.

Figure 4:
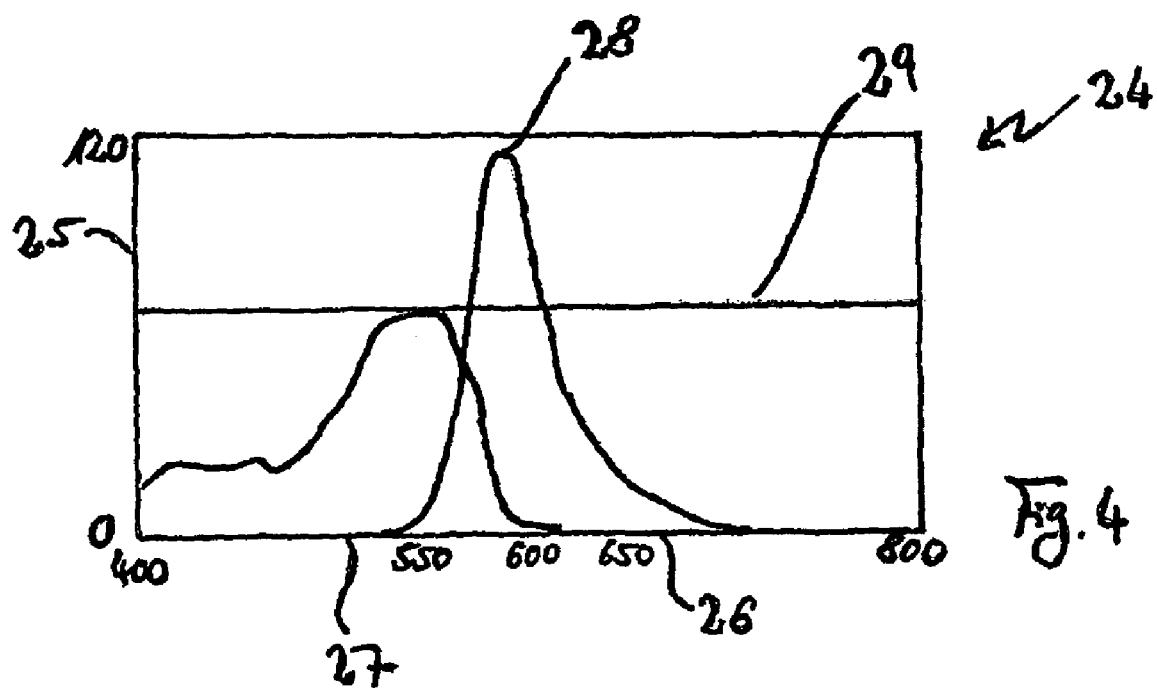
FIG. 4 shows a diagram of the reflection characteristic curve of flame red,
FIG. 5 schematically shows a system for storing light in a greenhouse,
FIG. 6 schematically shows a greenhouse with a vent stack,
FIG. 7 schematically shows a cold sink with an actively cooled piece of land,
FIG. 8 schematically shows the heat radiated from the actively cooled piece of land of FIG. 7 during the night,
FIG. 9 schematically shows a hot lake and
FIG. 10 schematically shows a lime cycle for a greenhouse.

The reflection characteristic curve of flame red is plotted in the diagram 24 in FIG. 4 with reference to the relative fluorescence intensity (without standard) on the ordinate 25 above the wavelength of the light in nm on the abscissa 26. A fluorescent emission spectrum is excited in particular at a wavelength 27 of 510 nm. A peak can be found via a wavelength of about 590 nm. A fluorescent excitation spectrum 20 lies approximately at an intensity of 70 on the ordinate 25.

Through the reflection properties of the fluid filter 11 and the flame red coated plate of the secondary reflector 22, a stray light 30 (labelled by way of example) is emitted into a plant room 31 in the form of red-yellow light.

Accordingly, not only the diffuse daylight enters the plant room 31 (for this daylight is not focussed to the focal point 12 on the greenhouse covering 7) but also the light spectrum that has been admitted through the fluid filter 11 and additionally the red-yellow shifted light 30 from the secondary reflector.

Figure 5:
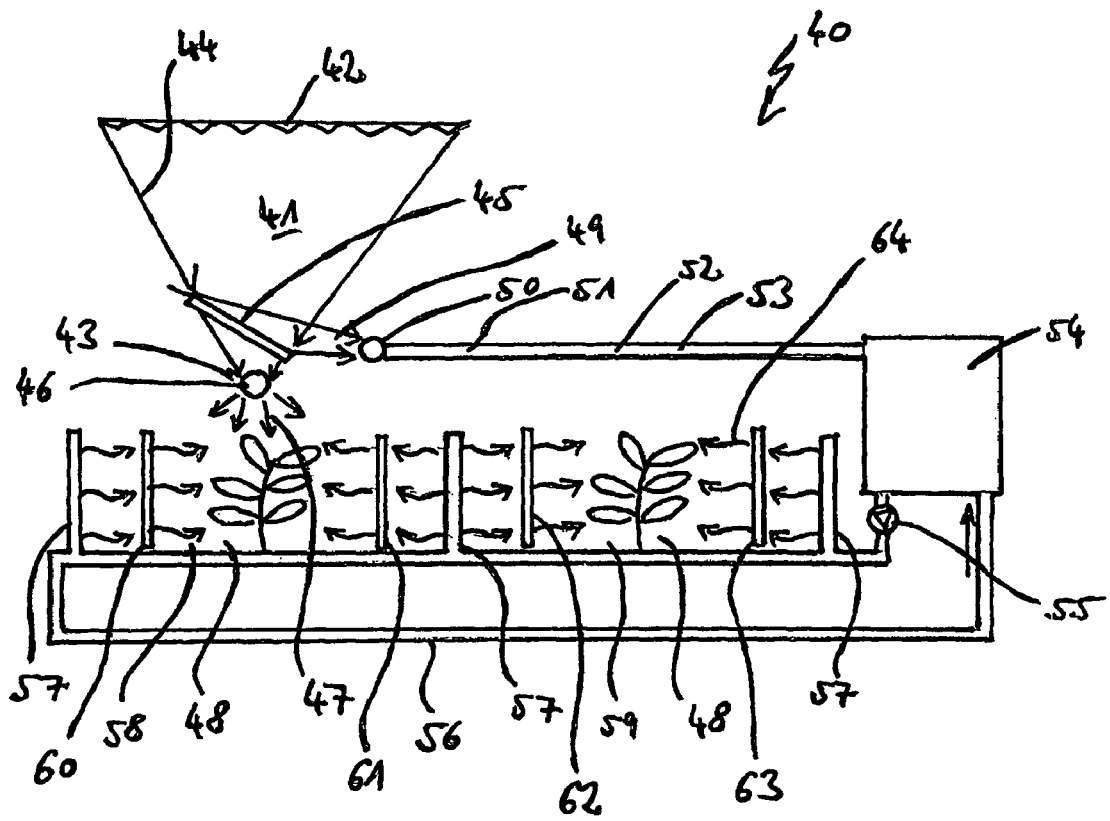

In the greenhouse 40 in FIG. 5, the principle described herein above is widely put into practice in a light input system 41. Beneath a greenhouse covering 42 composed of modular optical elements and in which an optimal system can track a focal point 43 of the sun, or which are devised so as to be capable of directing incident direct sunlight permanently in a bundle of rays 44 to the focal point 43, there is provided a dichroic filter 45. The dichroic filter 45 lies in the beam path of the bundle of rays 44 and is still located before the focal point 43. In the focal point 43, there is disposed an absorber tube 46 which directs the desired part of sunlight in stray radiation 47 into a plant room 48.

The dichroic filter 45 filters and reflects blue light 49 onto a transparent tube 50 that carries phosphorescent, green shining pigments 51 (labelled by way of example) in a transport liquid 52 in a tube 53. The tube 53 leads to a storage tank 54 which is thus capable of storing over the day, or generally over the time the sun is shining, strong green light.

At any time, in particular at night, the green shining light can be supplied to a light illuminating circuit 56 via a pump 55. The light illuminating circuit 56 leads the green shining liquid inter alia through three double plates 57 which are located in the plant room 48 and which, in the form of elongate, flat bodies, separate from each other different rows of plants 58, 59.

Between each double-walled body 57 connected to the circuit 56 and the rows of plants 58, 59 there are disposed fluorescent plates 60, 61, 62, 63 for the rows of plants 58, 59 not to be directly hit by green shining, phosphorescent light but by red-yellow light 64 (labelled by way of example). This increases plant growth also during the night.

Figure 6:
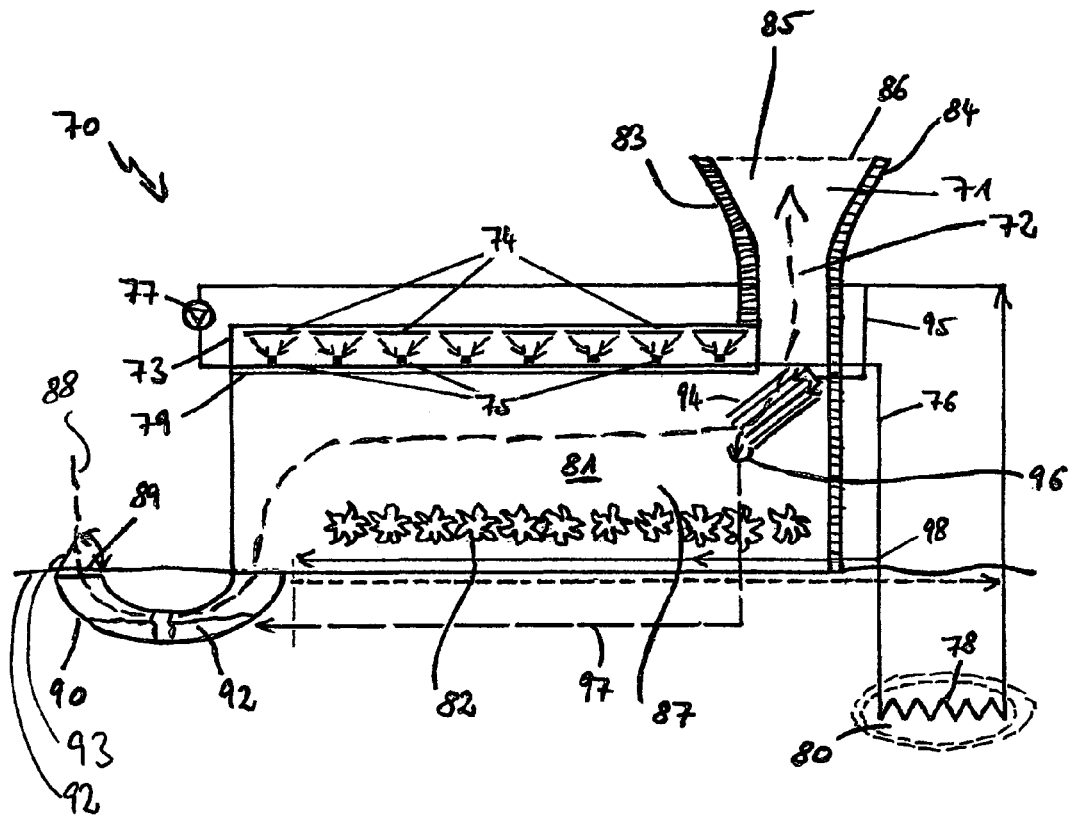

The greenhouse 70 in FIG. 6 utilizes a stack 71 for air circulation 72 (labelled schematically).

Underneath an outer fluoropolymer covering 73 having a thickness ranging between 120 μm and 140 μm there are disposed solar optics 74 (labelled by way of example). These optics concentrate the direct light onto photovoltaic and/or thermal receivers 75 (labelled by way of example).

Via a hot water line 76, cooling water is pumped with a pump 77 from the thermal receivers 75 to a geothermal heat exchanger 78.

All this still occurs above an inner fluoropolymer covering 79 of a thickness of less than 50 μm.

The geothermal heat exchanger 78 lies in a large underground thermal tank 80. This tank is typically devised for summer-winter operation; meaning it uses the summer sun for winter heating.

In order to supply an inner volume 81 of the greenhouse 70 in which plants 82 (labelled by way of example) are disposed with the air flow 72, the convective vent stack 71 is blackened on its side turned toward the sun and is metallized on its side turned away from the sun in its noon position. Concurrently, a heat insulation 83, 84 is applied to the outer side of the stack 71. All this causes the air in an interior volume 85 of the stack 71 to heat up to its maximum.

As a result, air is permanently drawn upward in the stack 71, the only flow resistance said air has to overcome being a fine mesh 86 against insect pests.

The vertically ascending air draft ensures a negative pressure in the interior volume 81 of the greenhouse 70 so that the air 87 contained therein is drawn which in turn draws external air 88 through an air inlet 89 in flat ground channels 90 and through these into the interior volume 81.

The flat ground channels 90 have a depth of for example 2 m to 4 m beneath the surface of the earth 91 and have a large water fill surface 92 so that the air is humidified on its flow path 72 into the interior volume 82 of the greenhouse 70 and can effect cooling by evaporation.

To control the air flow 72, there is provided a flap 93 on the air inlet 89, said air inlet being for the rest merely provided with a fly screen.

When the air flow 72 flows out of the interior volume 81 of the greenhouse 70 into the stack 71, a water-heat recuperator 94 is installed in the air flow 72 path. This recuperator is cooled via a cooling water supply 95 with cold water from the geothermal heat exchanger 87 so that the humidity contained in the air 87 inside the greenhouse is evacuated in the recuperator 94. The recuperator 94 is installed at an incline for water drains to lead to a water collector 96. From the water collector 96, a recirculation line 97 for condensate is installed which leads to the water surfaces 92 in the flat underground channels 90. In this way, the cooling water gets not lost to the overall system of the greenhouse 70 together with the outflowing air flow 72.

On the hot water line 76, between the photovoltaic cells 75 and the geothermal heat exchanger 78, there is connected a warm water tap line 98. This line can be typically utilized to conduct water at a temperature of about 30° C. for example as a ground heating underneath the plants 82 in order to heat the ground also in winter, for example to a temperature of about 20° C.

Between the outer fluoropolymer covering 73 and the inner fluoropolymer covering 79 there is preferably provided an active ventilation and heating of the intermediate space. This prevents from falling below the dew point with droplet condensation which negatively affects the visual transparency of the covering and plant growth.

Figure 7:
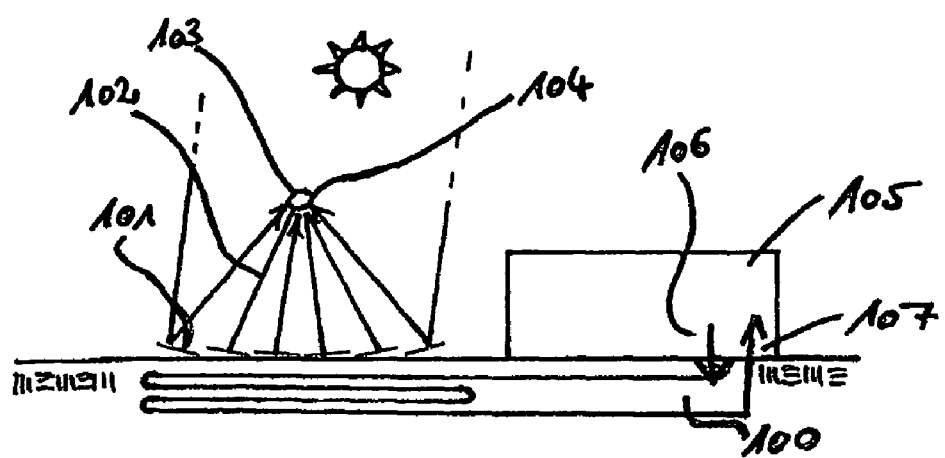
Figure 8:
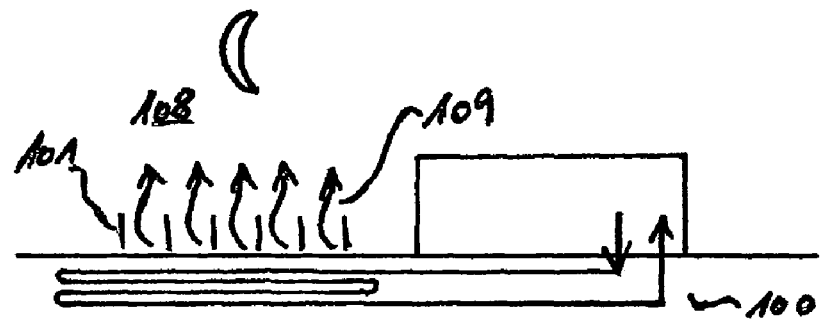

The actively cooled piece of land 100 in the FIGS. 7 and 8 is covered during sun radiation (see FIG. 7) with reflecting coverings 101 (labelled by way of example). They are oriented for the sunlight 102 (labelled by way of example) to be reflected to a focal point 103 located above the ground. There, there can be provided a tube 104 comprising a solar collector for using the reflected energy.

Beside the coverings 101, there is disposed a greenhouse 105. This greenhouse is connected to the piece of land 100 via a heat evacuation 106 and leads into a circuit line (not shown) in the ground of the piece of land, which runs underneath the coverings 101. It then leads back underneath the greenhouse 105 and there, via an inflow line 107, back into the interior of the greenhouse 105.

By night (see FIG. 8), the coverings 101 can be opened, they can for example be placed vertically. The piece of land 100 heated by the greenhouse 105 during the day can now dissipate its heat through heat radiation 109 into the clear night sky 108 which is quite cool, especially in arid regions.

Figure 9:
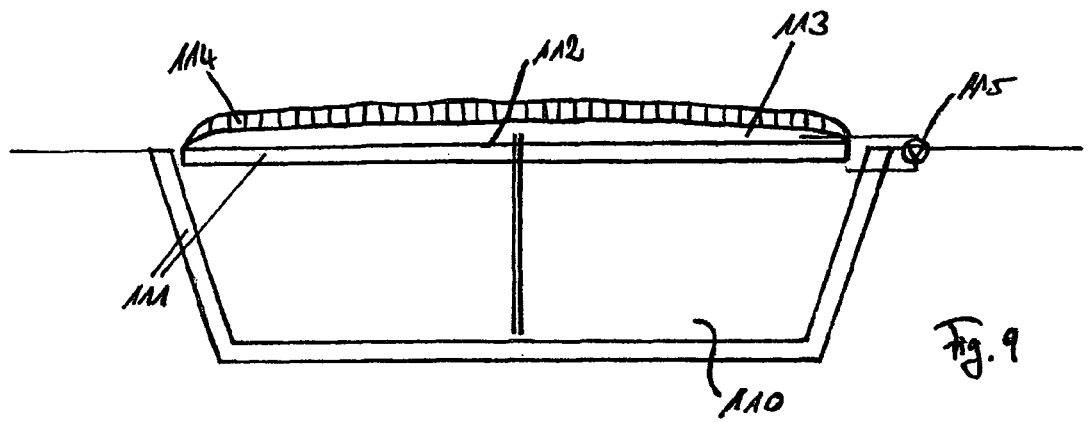

The hot lake 110 in FIG. 9 is completely surrounded with a heat insulation 111, for example made from foamed glass. A water bag 113 lies on a floating heat insulation 112. This water bag is covered with a transparent heat insulation 114.

Between the water in the interior of the hot lake 110 and the water bag 113 lying above the upper floating heat insulation 112 there is provided a pump 115 that can be activated ad lib.

Figure 10:
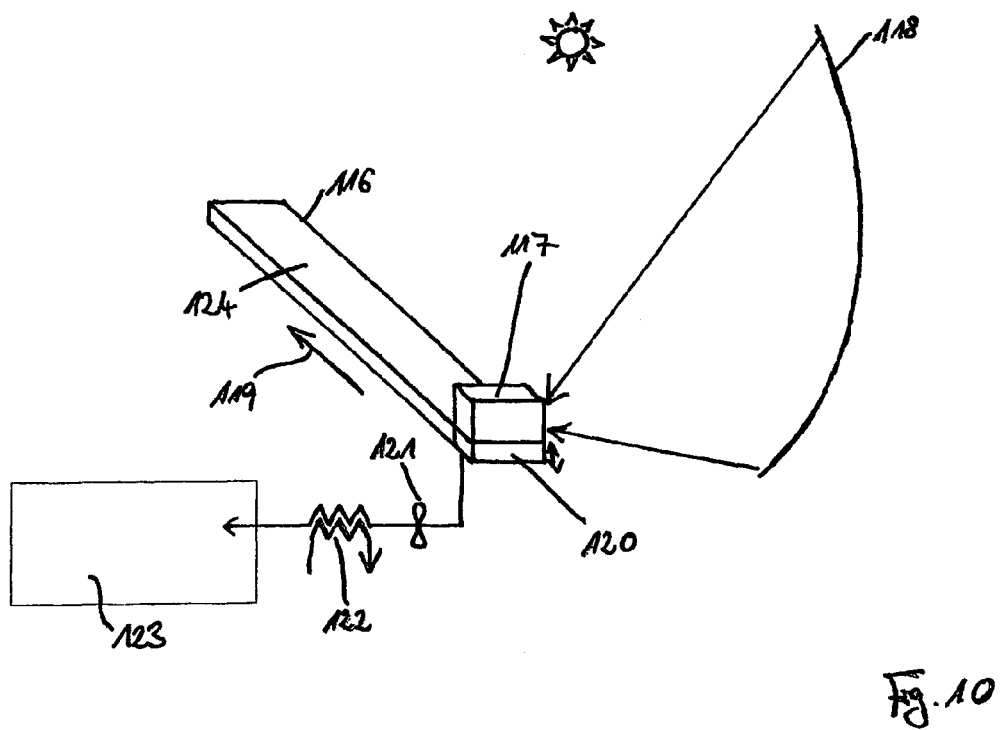

The lime cycle in FIG. 10 conveys calcium carbonate ($CaCO_3$) via a conveyor belt 116 into a box-shaped cavity receiver 117 that is disposed in the focal point of a fix focus mirror 118 and which is disposed on an absorber vibrating box 120 vibrating at right angles to the direction 119 in which the conveyor belt is running.

In the cavity receiver 117, the calcium carbonate is heated to such an extent that it burns. Temperatures of more than 1000° C. can be achieved. In the meantime, the calcium carbonate is vibrated in order to loosen it up and to achieve a fluidized bed heat transfer.

During burning, carbon dioxide ($CO_2$) is separated from the calcium carbonate. It is drawn from the process via an extractor fan 121 and is conducted through a heat exchanger 122 in order to dissipate heat at need. The possibly cooled flow of carbon dioxide is then conducted into a greenhouse 123 for increasing plant growth.

The burnt lime 124 is conveyed by the conveyor belt 116 in the direction of transport 119 so that it is brought into the free space where it draws carbon dioxide from the atmosphere. Then, it can be returned into the circuit; for this purpose it is recirculated to the cavity receiver 117 in the form of calcium carbonate.

The invention claimed is:

1. A filter system for filtering incident light for a greenhouse, comprising a spectral range reflector and a secondary reflector, said spectral range reflector being devised such that it filters and reflects a range of the PAR spectrum to the secondary reflector, residual light being admitted through the spectral range reflector to a plant area and filtered and reflected light being directed from the secondary reflector to the plant area.

2. The filter system as set forth in claim 1, wherein the spectral range reflector reflects at least part of the spectrum between about 500 nm and about 580 nm, preferably at least between about 520 nm and 560 nm.

3. The filter system as set forth in claim 1, wherein the spectral range filter for light is transparent up to about 500 nm.

4. The filter system as set forth in claim 1, wherein the spectral range filter for light is transparent from about 580 nm.

5. The filter system as set forth in claim 1, wherein it is devised to subject the filtered and reflected light to a phase-shifting.

6. The filter system as set forth in claim 5, wherein the phase-shifting leads to light of more than about 600 nm, preferably of more than about 680 nm.

7. The filter system as set forth in claim 1, wherein the incident light passes through a light-gathering optics and the spectral range reflector is disposed at an incline with respect to an optical axis of the light-gathering optics, in particular at an angle ranging from about 40° to about 50°.

8. The filter system as set forth in claim 7, wherein the spectral range reflector is interposed between the light-gathering optics and its focus.

9. The filter system as set forth in claim 1, wherein the spectral range reflector comprises a secondary focus for the filtered and reflected light.

10. The filter system as set forth in claim 1, wherein the light passing through the spectral range reflector is concentrated onto an absorber.

11. The filter system as set forth in claim 1, wherein the secondary reflector comprises one red and/or one yellow coating, in particular with a fluorescent dye, on its side illuminated by the spectral range reflector.

12. The filter system as set forth in claim 1, wherein a converter, in particular a solar cell, is disposed in the filtered and reflected light.

* * * * *

UNITED STATES PATENT AND TRADEMARK OFFICE
CERTIFICATE OF CORRECTION

| | | |
|---|---|---|
| PATENT NO. | : 8,156,685 B2 | Page 1 of 1 |
| APPLICATION NO. | : 12/224276 | |
| DATED | : April 17, 2012 | |
| INVENTOR(S) | : Juergen Kleinwaechter | |

It is certified that error appears in the above-identified patent and that said Letters Patent is hereby corrected as shown below:

Title Page,
Column 2, line 13, change "EP DE 32 23 445" to --DE 32 23 445--.

Signed and Sealed this
Fourteenth Day of August, 2012

David J. Kappos
*Director of the United States Patent and Trademark Office*